United States Patent
Kang et al.

(10) Patent No.: US 11,775,214 B2
(45) Date of Patent: Oct. 3, 2023

(54) MEMORY SYSTEM FOR SUSPENDING AND RESUMING EXECUTION OF COMMAND ACCORDING TO LOCK OR UNLOCK REQUEST, AND OPERATING METHOD THEREOF

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 23 days.

(21) Appl. No.: 17/338,246

(22) Filed: Jun. 3, 2021

(65) Prior Publication Data

US 2022/0171571 A1    Jun. 2, 2022

(30) Foreign Application Priority Data

Nov. 27, 2020   (KR) .......................... 10-2020-0162017

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0613; G06F 13/1642; G06F 3/0607; G06F 3/0658
See application file for complete search history.

(56) References Cited

U.S. PATENT DOCUMENTS

| | | | | |
|---|---|---|---|---|
| 7,343,432 | B1* | 3/2008 | Niver | G06F 9/526 710/36 |
| 2006/0027644 | A1* | 2/2006 | Takashi | G06F 3/0613 235/492 |
| 2006/0221720 | A1* | 10/2006 | Reuter | G06F 3/0659 365/189.05 |
| 2012/0158882 | A1* | 6/2012 | Oehme | G16H 30/20 709/213 |
| 2013/0117286 | A1* | 5/2013 | Gallant | G06F 3/0614 707/752 |
| 2013/0185495 | A1* | 7/2013 | Benhase | G06F 12/0246 711/E12.078 |
| 2014/0281050 | A1* | 9/2014 | Vogan | G06F 3/0659 710/14 |
| 2016/0283116 | A1* | 9/2016 | Ramalingam | G06F 3/0629 |
| 2017/0228167 | A1* | 8/2017 | Manohar | G06F 3/061 |

(Continued)

FOREIGN PATENT DOCUMENTS

KR       10-2031952 B1    10/2019
KR    10-2020-0023376 A    3/2020

*Primary Examiner* — Rocio Del Mar Perez-Velez
*Assistant Examiner* — Tong B. Vo
(74) *Attorney, Agent, or Firm* — IP & T GROUP LLP

(57) ABSTRACT

Embodiments of the present disclosure relate to a memory system and an operating method thereof. According to the embodiments of the present disclosure, the memory system may fetch a first command from the host into a command queue, suspend execution of the first command when receiving a lock request for the first command from the host, and resume the execution of the first command when receiving an unlock request for the first command or after the first command is suspended for an amount of time corresponding to a suspend time value transmitted together with the lock request.

10 Claims, 17 Drawing Sheets

(56) References Cited

U.S. PATENT DOCUMENTS

| | | | |
|---|---|---|---|
| 2017/0262176 A1* | 9/2017 | Kanno | G06F 12/0246 |
| 2017/0371828 A1* | 12/2017 | Brewer | G06F 13/28 |
| 2018/0011660 A1* | 1/2018 | Lesartre | G06F 3/0673 |
| 2020/0089537 A1* | 3/2020 | Bahirat | G06F 9/468 |
| 2020/0257552 A1* | 8/2020 | Park | G06F 9/485 |
| 2020/0409878 A1* | 12/2020 | Liu | G06F 13/1668 |
| 2021/0255801 A1* | 8/2021 | Jang | G06F 3/0659 |
| 2021/0255803 A1* | 8/2021 | Kanno | G06F 3/0656 |
| 2022/0013176 A1* | 1/2022 | Du | G11C 16/26 |
| 2022/0057966 A1* | 2/2022 | Kanno | G06F 3/0653 |
| 2022/0137856 A1* | 5/2022 | Siciliani | G06F 3/0659 711/154 |
| 2022/0221987 A1* | 7/2022 | Noh | G06F 3/0643 |
| 2022/0276799 A1* | 9/2022 | Kumar | G06F 3/0643 |

* cited by examiner

MEMORY SYSTEM FOR SUSPENDING AND RESUMING EXECUTION OF COMMAND ACCORDING TO LOCK OR UNLOCK REQUEST, AND OPERATING METHOD THEREOF

CROSS-REFERENCE TO RELATED APPLICATION

The present application claims priority under 35 U.S.C. 119(a) to Korean patent application number 10-2020-0162017 filed on Nov. 27, 2020, which is incorporated herein by reference in its entirety.

BACKGROUND

1. Technical Field

Various embodiments of the present disclosure relate to a memory system and an operating method thereof.

2. Related Art

A memory system includes a data storage device that stores data on the basis of a request from a host, such as a computer, servers, a smartphone, a tablet PC, or other electronic devices. Examples of a memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

In general, the memory system may process commands received from the host according to the input order. Accordingly, a command input to the memory system later may be processed after the command previously input to the memory system is processed.

SUMMARY

Embodiments of the present disclosure may provide a memory system and an operating method thereof capable of enabling the host to control the execution order of commands.

Furthermore, embodiments of the present disclosure may provide a memory system and an operating method thereof capable of preventing a problem in which the execution time for other commands is delayed due to a command which is processing a large amount of data.

In one aspect, embodiments of the present disclosure may provide a memory system including a memory device and a memory controller for communicating with the memory device and controlling the memory device to process commands requested by a host.

The memory controller may fetch a first command from the host into a command queue.

The memory controller may suspend execution of the first command when receiving a lock request for the first command from the host.

The memory controller may resume the execution of the first command when receiving an unlock request for the first command or after the execution of the first command is suspended for an amount of time corresponding to a suspend time value transmitted together with the lock request.

As an example, the memory controller may include a locker, which is a buffer for storing a command for which the host transmits the lock request, and may further store the first command in the locker when receiving a lock request for the first command from the host. In this case, the memory controller may pop the first command from the locker when resuming the execution of the first command.

As another example, the memory controller may abort the first command when receiving the lock request for the first command from the host. In this case, the memory controller may fetch again the first command into the command queue when resuming the execution of the first command.

In another aspect, embodiments of the present disclosure may provide an operating method of a memory system.

The operating method of the memory system may include fetching a first command from a host into a command queue.

In addition, the operating method of the memory system may include receiving a lock request for the first command from the host.

In addition, the operating method of the memory system may include suspending execution of the first command when receiving the lock request for the first command from the host.

Furthermore, the operating method of the memory system may include resuming the execution of the first command when receiving an unlock request for the first command or after the execution of the first command is suspended for an amount of time corresponding to a suspend time value transmitted together with the lock request.

As an example, suspending the execution of the first command may include storing the first command in a locker when receiving a lock request for the first command from the host, and the locker may be a buffer for storing a command for which the host transmits the lock request. In this case, the operating method of the memory system may further include popping the first command from the locker when resuming the execution of the first command.

As another example, suspending the execution of the first command may include aborting the first command when receiving the lock request for the first command from the host. In this case, the operating method of the memory system may further include fetching again the first command into the command queue when resuming the execution of the first command.

In another aspect, embodiments of the present disclosure may provide an operating method of a controller.

The operating method of the controller may include scheduling commands.

The operating method of the controller may include executing the scheduled commands.

Executing the scheduled commands may include executing a subsequent command among the scheduled commands while interrupting, in response to a first request from a host, execution of a current command among the scheduled commands.

Executing the scheduled commands may include executing, in response to a second request from the host or after a predetermined amount of time, the execution-interrupted command after the executing of the subsequent command.

According to the embodiments of the present disclosure, it is possible to enable the host to control the execution order of commands.

Furthermore, according to the embodiments of the present disclosure, it is possible to prevent a problem in which the execution time for other commands is delayed due to a command which is processing a large amount of data.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
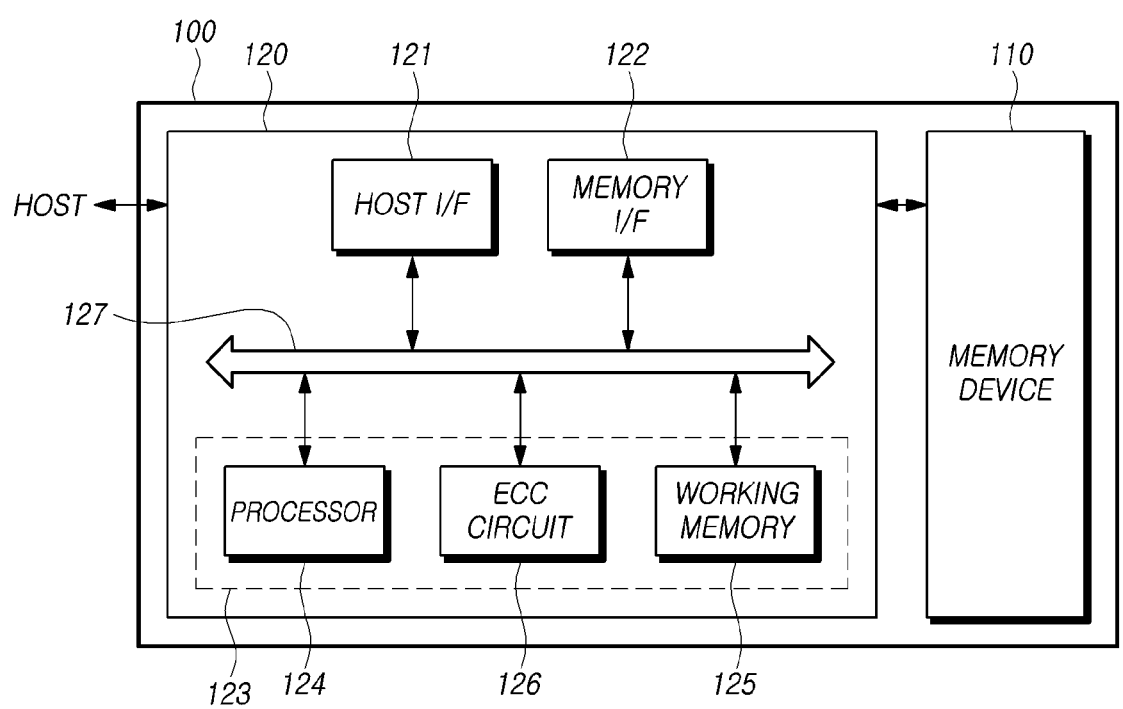
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or is equal to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
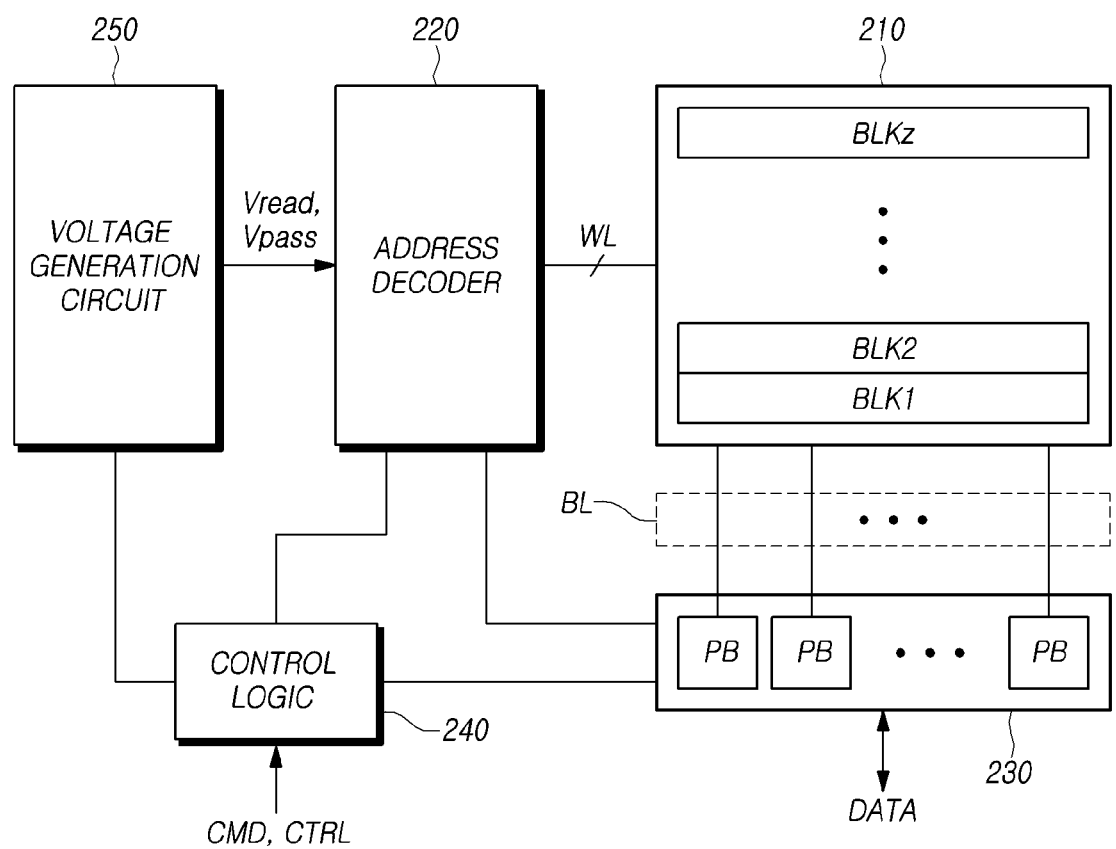
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
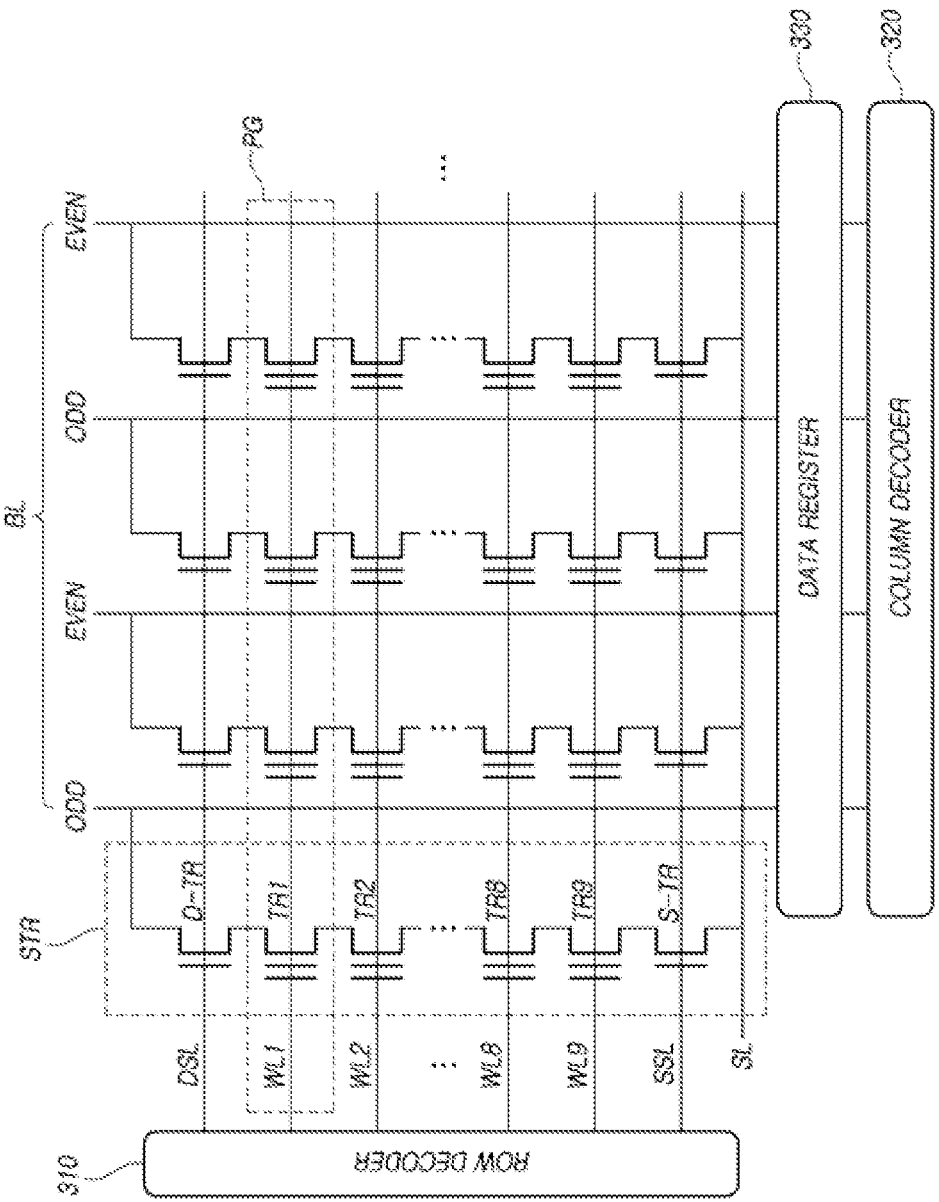
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called a "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
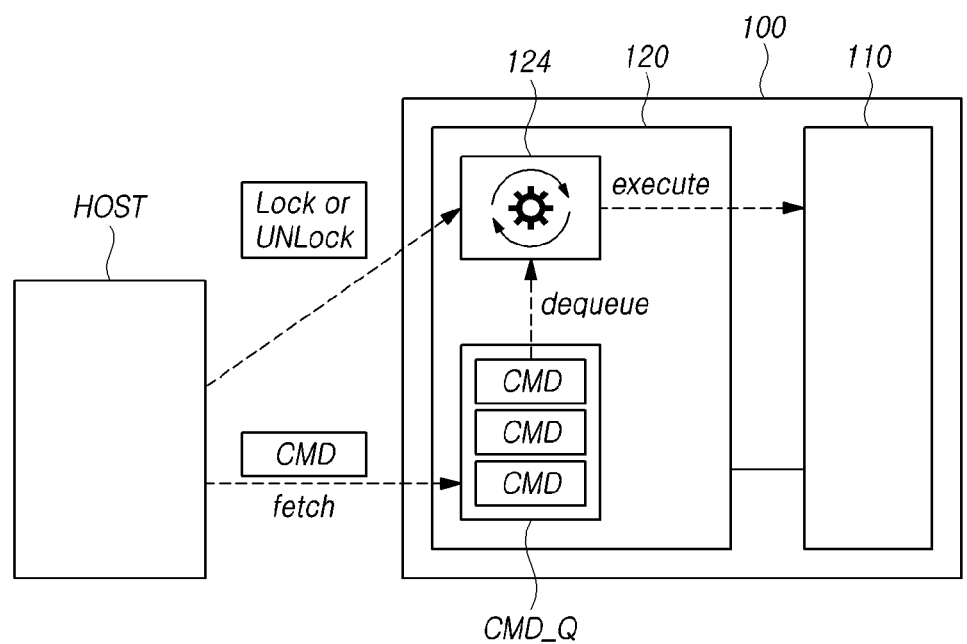
FIG. 4 is a diagram schematically illustrating an operation of the memory system according to embodiments of the present disclosure.

FIG. 4 is a diagram schematically illustrating an operation of the memory system 100 according to embodiments of the present disclosure.

Referring to FIG. 4, the memory controller 120 of the memory system 100 may fetch the command CMD from the host HOST into the command queue CMD_Q. In this case, the memory controller 120 may fetch the command CMD to the command queue CMD_Q through the host interface 121.

The command queue CMD_Q may be located on the working memory 125 of the memory controller 120, and may be implemented using a data structure such as a linear queue, a circular queue and a linked list.

In addition, the memory controller 120 fetches the command to the command queue CMD_Q may mean that the memory controller 120 copies the command stored in a specific area of the host and stores it in the command queue CMD_Q.

In addition, the processor 124 of the memory controller 120 may dequeue and execute the command CMD stored in the command queue CMD_Q. For example, if the command to be executed is the read command, the processor 124 may read data from the memory device 110, and if the command to be executed is the write command, the processor 124 may write data to the memory device 110.

Further, the memory controller 120 may receive a lock request or an unlock request for the command CMD from the host HOST. The lock request for a command is a request instructing to suspend execution of the command, and the unlock request for a command is a request instructing to resume execution of the command. Details of the lock request and the unlock request for the command will be described in detail with reference to FIGS. 6 to 7 below. In this case, the memory controller 120 may receive the lock request or the unlock request for the command CMD through the host interface 121 and transmit the received lock request or unlock request to the processor 124.

Figure 5:
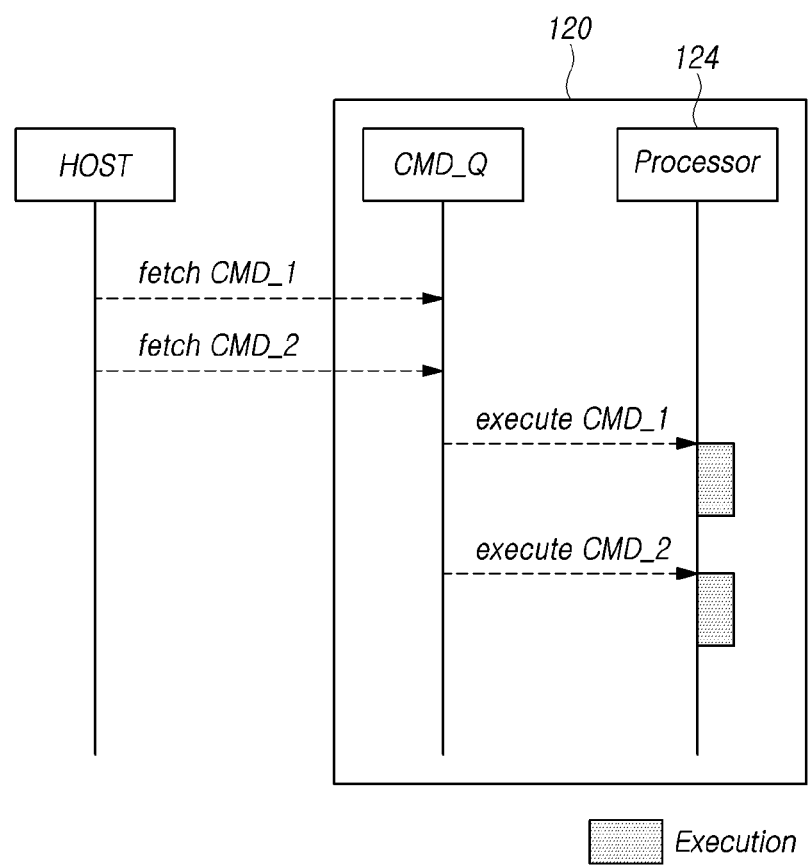
FIG. 5 is a diagram illustrating an example of executing the command by the memory controller according to embodiments of the present disclosure.

FIG. 5 is a diagram illustrating an example of executing the command by the memory controller 120 according to embodiments of the present disclosure.

Referring to FIG. 5, the memory controller 120 of the memory system 100 may fetch the first command CMD_1 and the second command CMD_2 from the host HOST.

As an example, the host HOST may include a separate host command queue therein, and may store commands in the host command queue through an internal scheduler. In addition, the host may store the command in the host command queue and then set a doorbell register to notify the memory system 100 that a command to be processed is stored in the host command queue.

After confirming that the doorbell register is set, the memory controller 120 may fetch the command from the host command queue into the command queue CMD_Q. In this case, the memory controller 120 may store a command received from the host in the command queue CMD_Q according to a preset scheduling policy.

In addition, the processor 124 of the memory controller 120 may execute the first command CMD_1 and the second command CMD_2 fetched from the host HOST. In this case, the order of executing the first command CMD_1 and the second command CMD_2 may be scheduled by the memory controller 120. Therefore, in general, the host cannot control the order of executing the commands by the memory controller 120 other than a method of transmitting a request to abort the command.

However, if the command execution order is determined only by the memory controller 120, the timing of executing a specific command by the memory system 100 may be delayed. Therefore, there may be a problem that performance experienced by a user using the host may be degraded.

For example, the host may download large-sized data (e.g., software, video files, image files) while simultaneously processing small-sized data (e.g., web pages). In this case, the memory system 100 may execute a large data command for processing large-sized data from the host, and then execute a small data command for processing small-sized data.

Therefore, the small data command may be executed after the memory system 100 completes execution of the large data command. Accordingly, the response time to the small data command may be delayed by the time required to execute the large data command.

However, the user of the host may generally intend to process small data quickly. Therefore, if the operation of processing small-sized data is delayed, the user using the host may be likely to feel that the performance of the host has deteriorated.

Therefore, in order to solve this problem, there may be a need for a method in which the host can control the memory system 100 so that the small data command is processed before the large data command. Hereinafter, in embodiments of the present invention, it will be described the operation in which the host transmits the lock request to the memory system 100.

Figure 6:
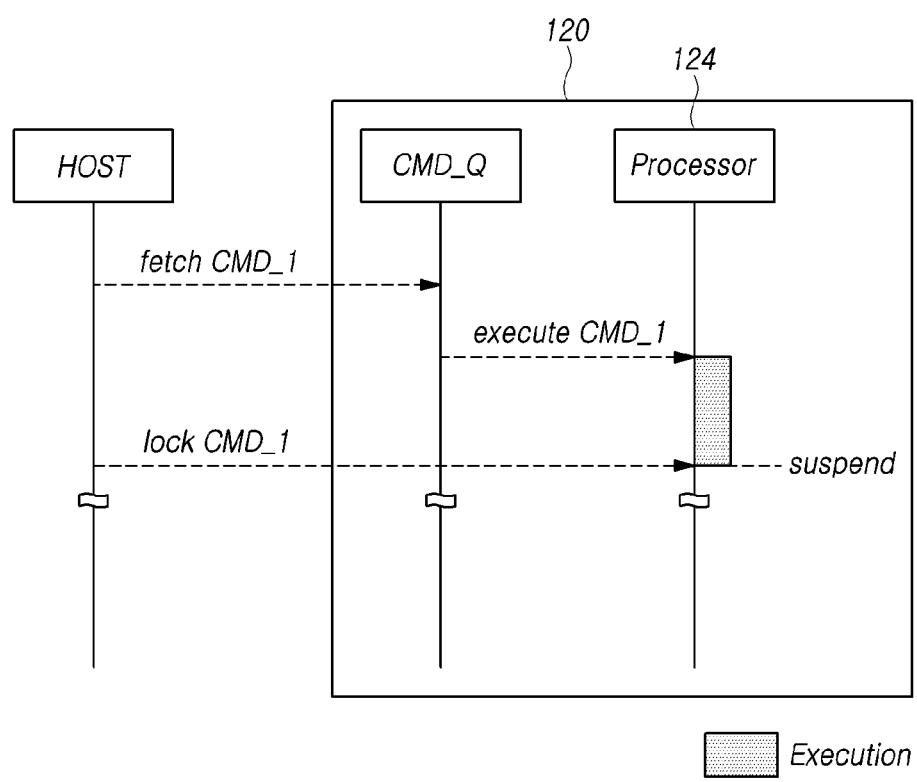
FIG. 6 is a diagram illustrating an example in which the memory controller suspends execution of a first command based on the lock request according to embodiments of the present disclosure.

FIG. 6 is a diagram illustrating an example in which memory controller 120 suspends execution of the first command CMD_1 based on the lock request according to embodiments of the present disclosure.

Referring to FIG. 6, the host HOST may transmit the lock request for the first command CMD_1 to the memory controller 120 of the memory system 100. The lock request for the first command CMD_1 is a request instructing to suspend execution of the first command CMD_1. For example, the host may transmit the lock request to the memory controller 120 through a separate command or an electrical signal.

The processor 124 of the memory controller 120 may suspend the execution of the first command CMD_1 when receiving the lock request for the first command CMD_1 from the host.

FIG. 6 only illustrates the case in which the lock request for the first command CMD_1 is received from the host HOST while the processor 124 is executing the first command CMD_1. However, the lock request for the first command CMD_1 may be received from the host before the first command CMD_1 is executed. In this case, the processor 124 may change the first command CMD_1 into the inexecutable state, or prohibit the first command CMD_1 from being enqueued to the command queue CMD_Q if the first command CMD_1 is not enqueued to the command queue CMD_Q yet or dequeue the first command CMD_1 from the command queue and then store it in the locker to be described later.

The memory controller 120 may resume execution of the first command CMD_1 whose execution has been suspended in the following cases.

Figure 7:
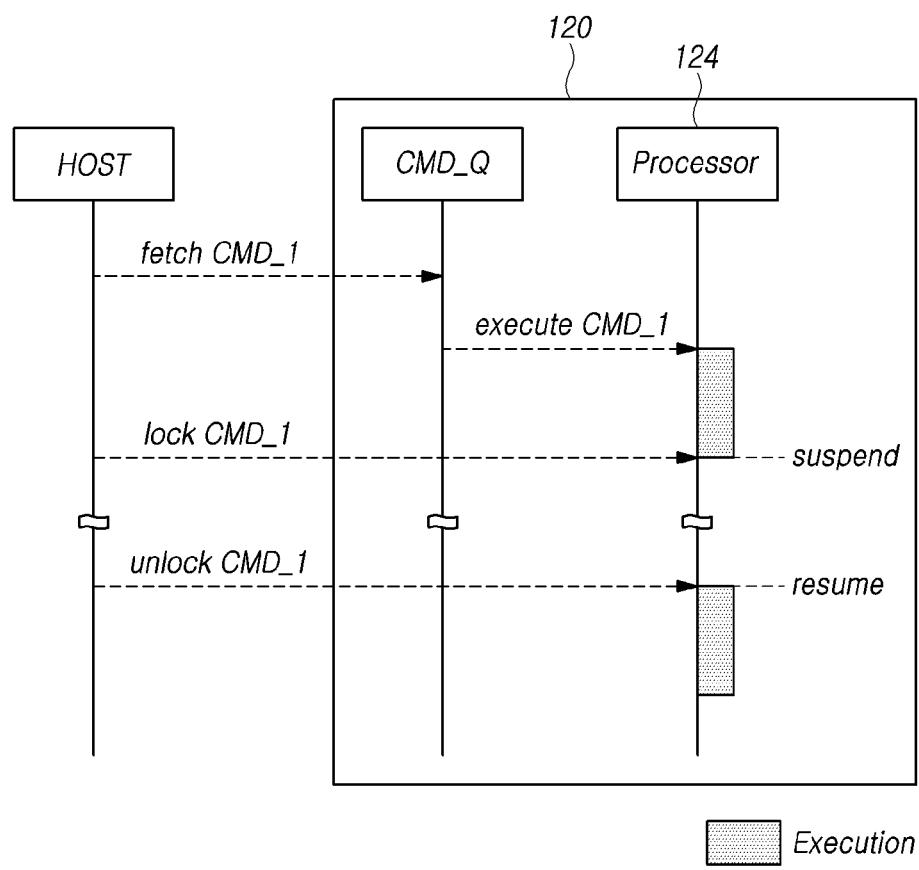
FIG. 7 is a diagram illustrating an example in which the memory controller resumes execution of the first command according to embodiments of the present disclosure.

FIG. 7 is a diagram illustrating an example in which the memory controller 120 resumes execution of the first command CMD_1 according to embodiments of the present disclosure.

Referring to FIG. 7, after the execution of the first command CMD_1 is suspended by the lock request from the host, the host HOST may transmit the unlock request for the first command CMD_1 whose execution is suspended to the memory controller 120. The unlock request for the first command CMD_1 is a request instructing to resume execution of the suspended first command CMD_1. Similar to the lock request, the host may transmit the unlock request to the memory controller 120 through a separate command or an electrical signal.

The processor 124 of the memory controller 120 may resume execution of the suspended first command CMD_1 when receiving the unlock request for the first command CMD_1 from the host HOST. If the first command CMD_1 is not yet executed and thus is in the inexecutable state due to the lock request, the processor 124 may change the first command CMD_1 into an executable state due to the unlock request.

Figure 8:
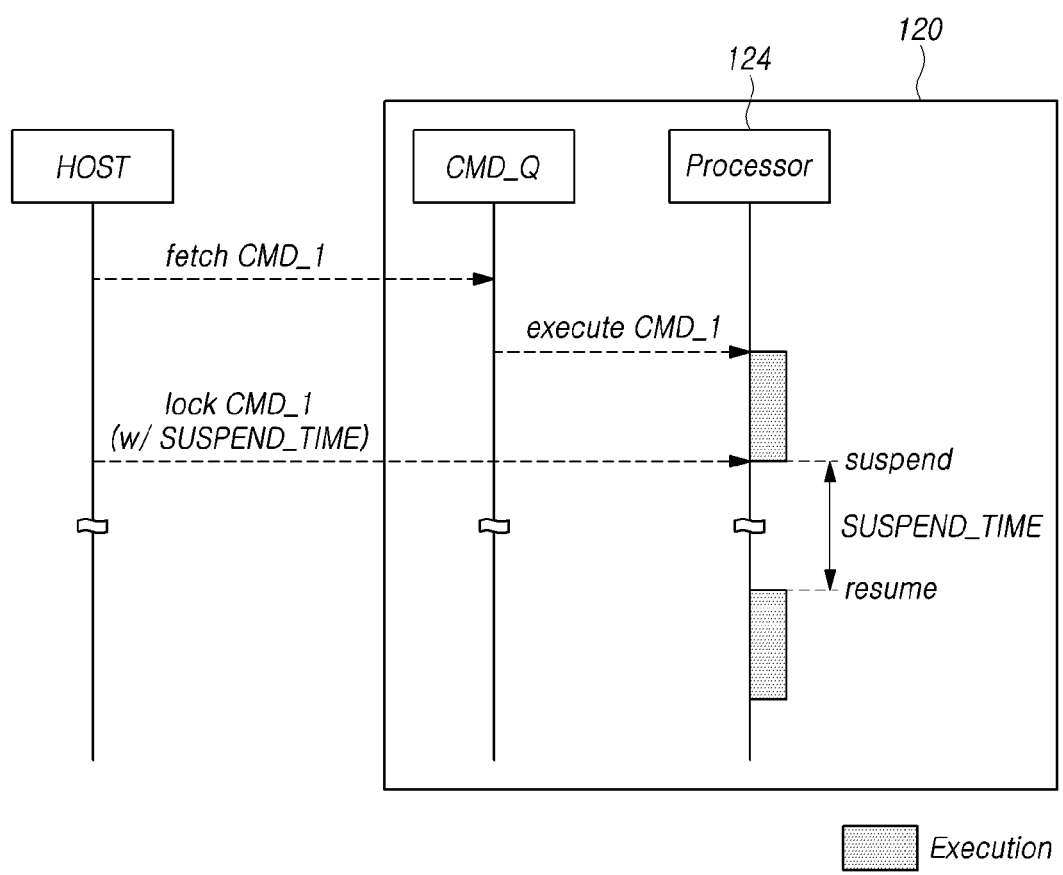
FIG. 8 is a diagram illustrating another example in which the memory controller resumes execution of the first command according to embodiments of the present disclosure.

FIG. 8 is a diagram illustrating another example in which the memory controller 120 resumes execution of the first command CMD_1 according to embodiments of the present disclosure.

Referring to FIG. 8, instead of explicitly transmitting the unlock request to the memory controller 120 as shown in FIG. 7, the host HOST may indicate the time point of resuming the execution of the first command CMD_1 by also transmitting information on the suspend time SUSPEND_TIME, which is the maximum time during which execution of the first command CMD_1 can be suspended, when transmitting the lock request.

In this case, the memory controller 120 may automatically resume the execution of the first command CMD_1 even without the unlock request form the host HOST, if the time more than the suspend time SUSPEND_TIME lapses after execution of the first command CMD_1 is suspended. If the first command CMD_1 was in a state before being executed, the processor 124 may change the first command CMD_1 into the executable state.

When the execution of the first command CMD_1 is completed after resuming execution of the first command CMD_1, the processor 124 may transmit the response message for the execution result of the first command CMD_1 to the host HOST.

As described in FIGS. 6 to 8, the host HOST may control execution of the first command CMD_1 based on the lock request for the first command CMD_1 to the memory controller 120. If the first command CMD_1 is a command for processing a large amount of data, the host HOST may transmit the lock request for the first command CMD_1 to the memory controller 120 to suspend the execution of the first command CMD_1, to control the memory controller 120 to process other commands. As a result, the host may indirectly control the execution order of commands, and prevent delays in execution of other commands requiring rapid processing for QoS satisfaction due to the first command CMD_1.

Hereinafter, the detailed operation of the memory controller 120 processing the lock request and the unlock request received from a host HOST will be described.

Figure 9:
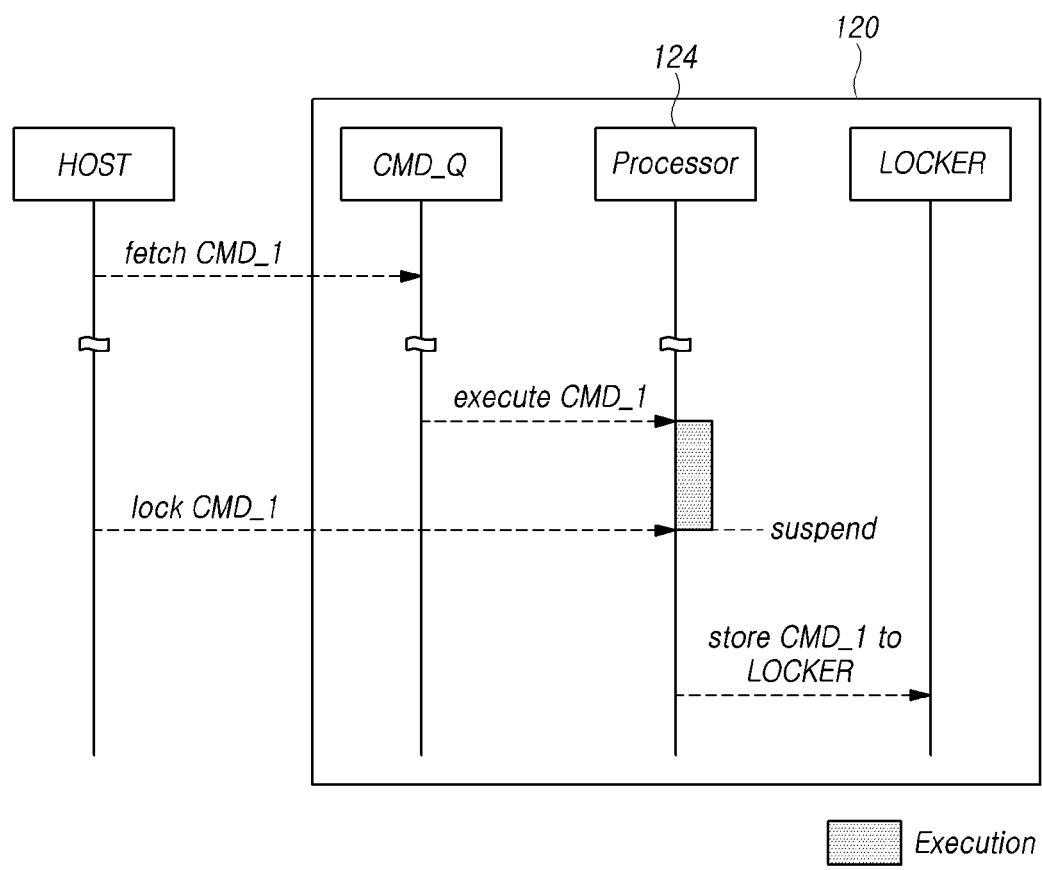
FIG. 9 is a diagram illustrating an example in which the memory controller processes the lock request according to embodiments of the present disclosure.

FIG. 9 is a diagram illustrating an example in which the memory controller 120 processes the lock request according to embodiments of the present disclosure.

Referring to FIG. 9, the host HOST may transmit the lock request for the first command CMD_1 to the memory controller 120. When the processor 124 of the memory controller 120 receives the lock request for the first command CMD_1 from the host HOST, the processor 124 may suspend the execution of the first command CMD_1.

In this case, the processor 124 may store the first command CMD_1 in the locker after suspending execution of the first command CMD_1. On the other hand, if the processor 124 receives the lock request for the first command CMD_1 from the host before the first command CMD_1 is executed, the processor 124 may move the first command CMD_1 from the command queue CMD_Q to the locker LOCKER.

The locker is an area for storing a command for which the host transmits the lock request, and may be located inside the memory controller 120. The command stored in the locker LOCKER may be executed after the host transmits the unlock request for the command or after the execution of the command is suspended for an amount of time corresponding to the suspend time value transmitted together with the lock request for the command. In addition, the memory controller 120 may not execute the corresponding command while the corresponding command is stored in the locker, but may execute other commands instead.

When transmitting the lock request for the command to the memory controller 120, the host HOST may also transmit key information for the command. In this case, the memory controller 120 may store key information for the corresponding command in the locker together with the command. In addition, when processing the unlock request for the corresponding command, the memory controller 120 may determine whether to unlock the corresponding command by comparing key information transmitted together with the unlock request with key information stored in the locker.

Figure 10:
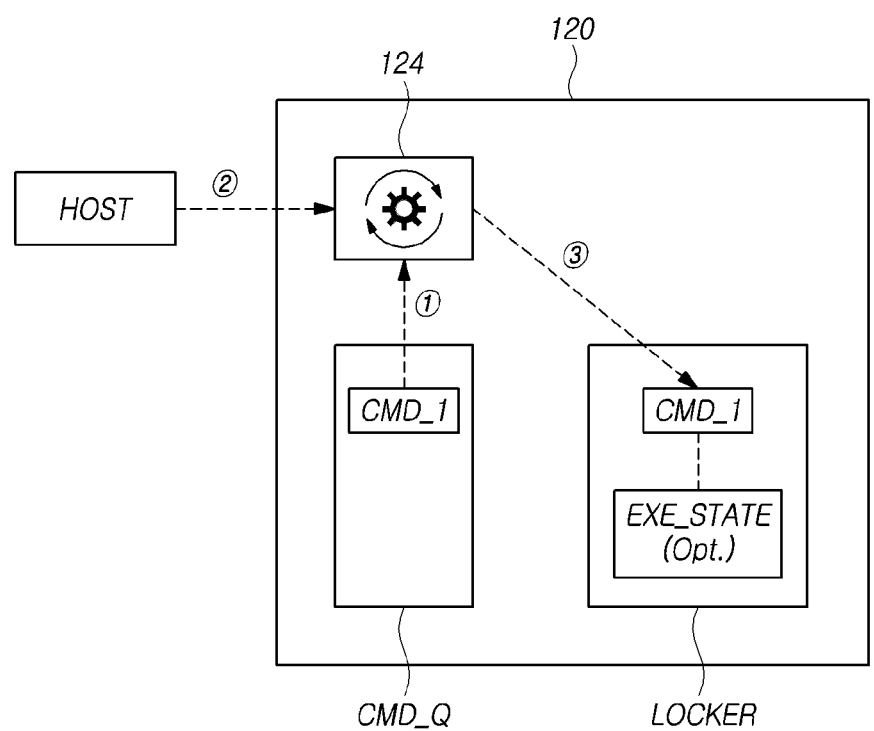
FIG. 10 is a diagram illustrating an example of an operation of a memory controller.

FIG. 10 is a diagram illustrating an example of an operation of the memory controller 120.

Referring to FIG. 10, the processor 124 of the memory controller 120 may dequeue and execute the first command CMD_1 in the command queue CMD_Q (①). In addition, when receiving the lock request for the first command CMD_1 from the host HOST (②), the processor 124 may suspend the execution of the first command CMD_1 and store the first command CMD_1 in the locker LOCKER (③).

In this case, when storing the first command CMD_1 into the locker LOCKER, the processor 124 may further store the execution state information EXE_STATE indicating the state of the first command CMD_1 before the execution of the first command CMD_1 is suspended in the locker LOCKER.

The execution state information EXE_STATE of the first command CMD_1 may include, for example, information related to the first command CMD_1 (e.g., LBA/length/slot information), size information of the processed data (e.g., size of data written to the memory device 110), or meta information (e.g., a location where a cache hit occurs if the first command CMD_1 is a read command, information on an open memory block if the first command CMD_1 is a write command, and page information (PI)).

When resuming execution of the first command CMD_1, the processor 124 may determine the location where the execution of the first command CMD_1 is to be resumed based on the execution state information EXE_STATE of the first command CMD_1 stored in the locker LOCKER, and may skip an operation on already processed data when resuming the execution of the first command CMD_1 and execute only an operation on unprocessed data.

Figure 11:
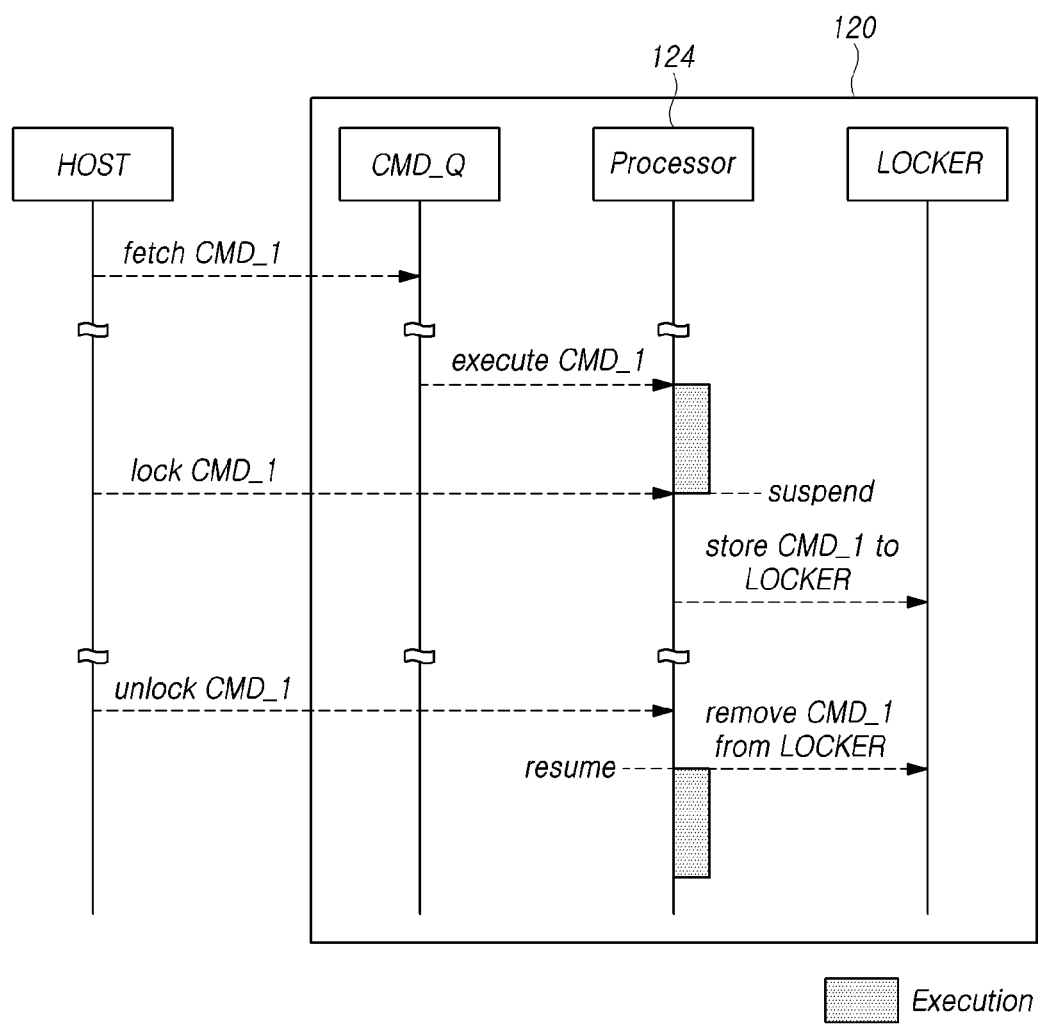
FIG. 11 is a diagram illustrating an example in which the memory controller described in FIG. 9 resumes execution of the first command.

FIG. 11 is a diagram illustrating an example in which the memory controller 120 described in FIG. 9 resumes execution of the first command CMD_1.

Referring to FIG. 11, the host HOST may transmit the lock request for the first command CMD_1 to the memory controller 120 while executing the first command CMD_1. When receiving the lock request for the first command CMD_1 from the host HOST, the processor 124 of the memory controller 120 may suspend executing the first command CMD_1 and store the first command CMD_1 in the locker LOCKER.

Thereafter, the host HOST may transmit the unlock request for the first command CMD_1 to the memory controller 120. When the processor 124 of the memory controller 120 receives the unlock request for the first command CMD_1 from the host and resumes execution of the first command CMD_1, the processor 124 may execute an operation in which the first command CMD_1 is retrieved from the locker and then removed, or an operation to invalidate the first command CMD_1 stored in the locker. The execution of the first command CMD_1 may be resumed due to the unlock request for the first command CMD_1.

Furthermore, even when execution of the first command CMD_1 is resumed after the execution of the first command CMD_1 is suspended for an amount of time corresponding to the suspend time value transmitted together with the lock request for the first command CMD_1, the processor 124 of the memory controller 120 may remove the first command CMD_1 from the locker.

Figure 12:
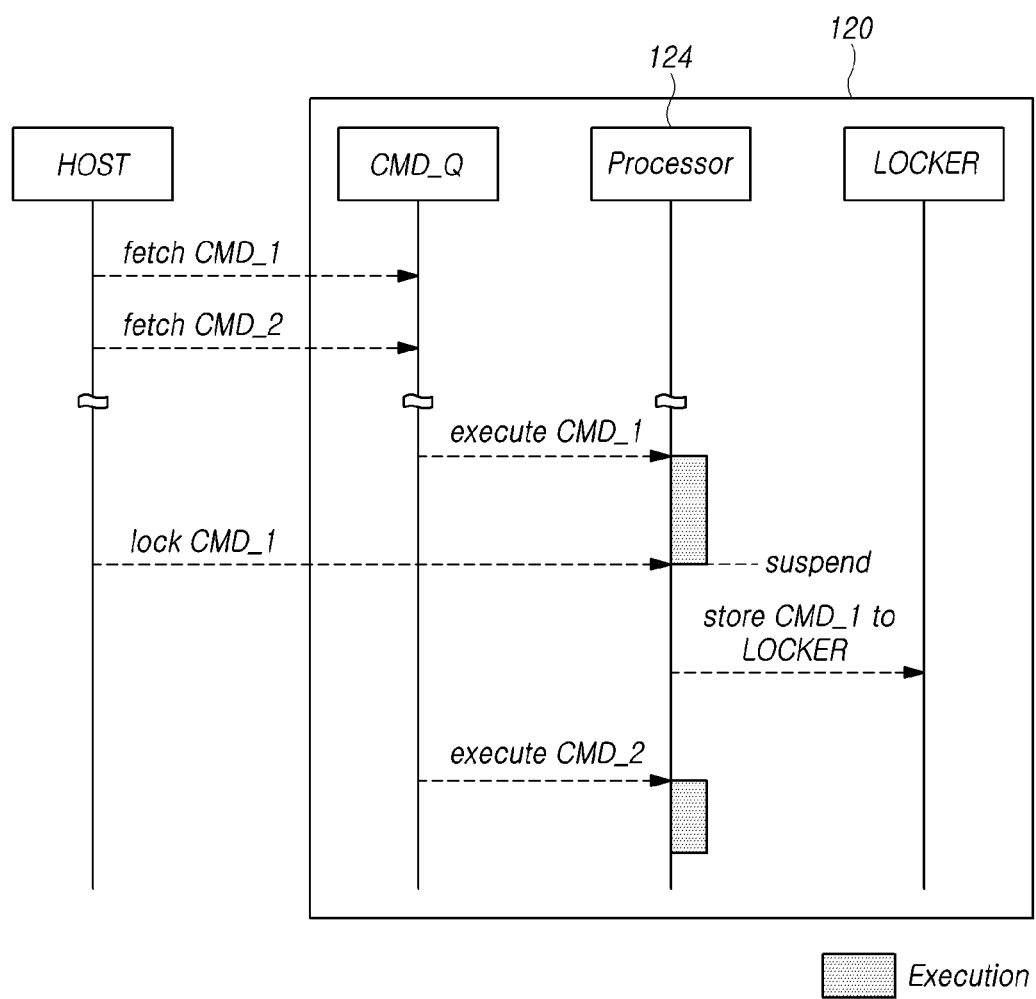
FIG. 12 is a diagram illustrating an example in which the memory controller described in FIG. 9 processes a second command after suspending the execution of the first command.

FIG. 12 is a diagram illustrating an example in which the memory controller 120 described in FIG. 9 processes a second command CMD_2 after suspending the execution of the first command CMD_1.

Referring to FIG. 12, the host HOST may transmit a lock request for the first command CMD_1 to the memory controller 120 while the first command CMD_1 is being executed. When receiving the lock request for the first command CMD_1 from the host HOST, the processor 124 of the memory controller 120 may suspend the execution of the first command CMD_1 and store the first command CMD_1 in the locker LOCKER.

Thereafter, the processor 124 of the memory controller 120 may dequeue and execute the second command CMD_2 from the command queue CMD_Q. Therefore, the host HOST may advance the execution time of the second command CMD_2 by suspending the execution of the first command CMD_1 even without directly requesting the execution of the second command CMD_2.

Figure 13:
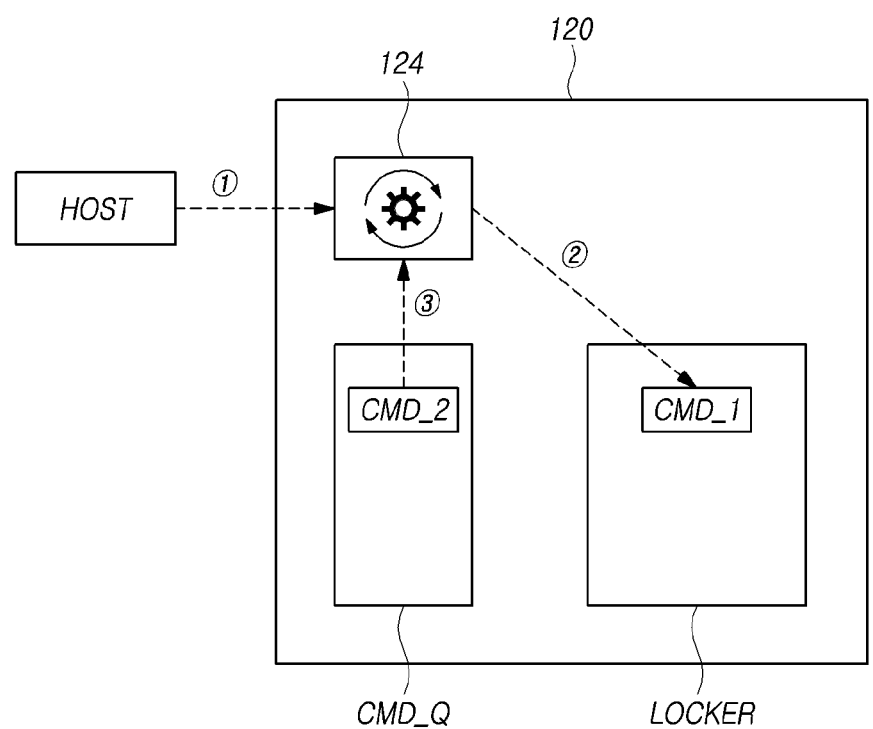
FIG. 13 is a diagram illustrating an example of a state of the memory controller described in FIG. 12.

FIG. 13 is a diagram illustrating an example of a state of the memory controller 120 described in FIG. 12.

Referring to FIG. 13, when receiving the lock request for the first command CMD_1 from the host (①), the processor 124 of the memory controller 120 may suspend the execution of the first command CMD_1 and store the first command CMD_1 in the locker LOCKER (②).

The processor 124 may dequeue the second command CMD_2 from the command queue CMD_Q and then execute the second command CMD_2 (③).

Figure 14:
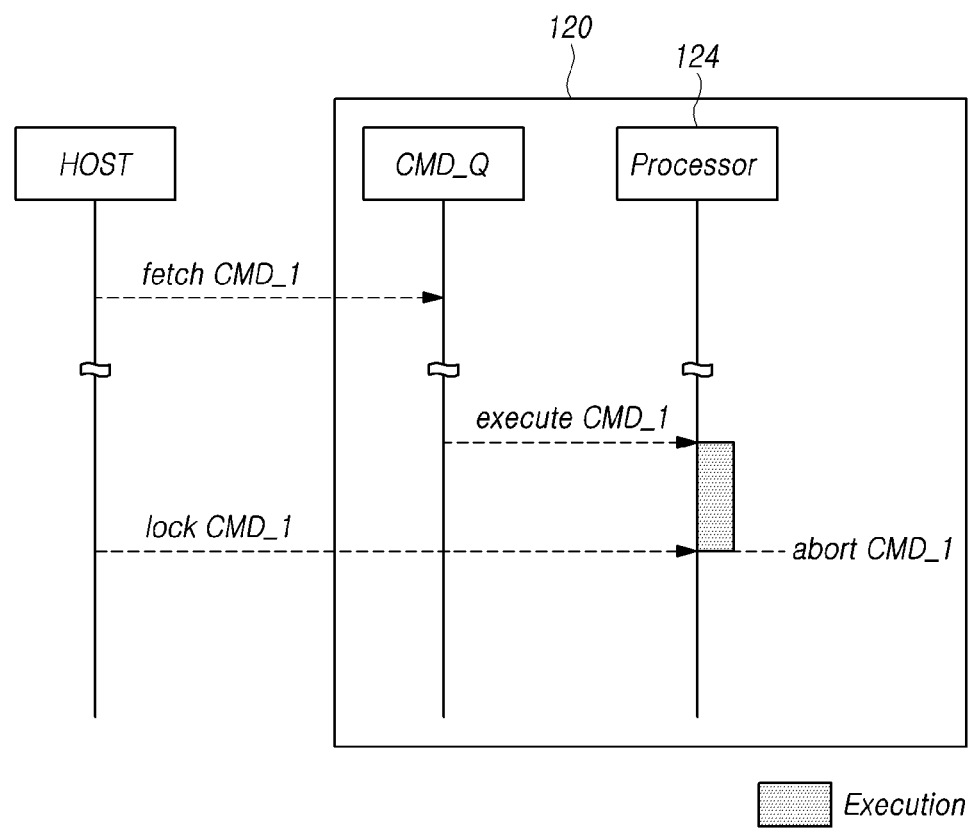
FIG. 14 is a diagram illustrating another example in which the memory controller processes the lock request according to embodiments of the present disclosure.

FIG. 14 is a diagram illustrating another example in which the memory controller 120 processes the lock request according to embodiments of the present disclosure.

Referring to FIG. 14, the host HOST may transmit the lock request for the first command CMD_1 to the memory controller 120 while the first command CMD_1 is being executed. The processor 124 of the memory controller 120 may suspend the execution of the first command CMD_1 when receiving the lock request for the first command CMD_1 from the host.

Thereafter, the processor 124 may abort the first command CMD_1 instead of storing the first command CMD_1 in the locker as shown in FIG. 9. When the first command CMD_1 is aborted, information related to the first command CMD_1 may be erased from the memory controller 120 except interrupted point of execution of the first command CMD_1. In this case, the memory controller 120 has an advantage that it is not necessary to separately maintain the locker of FIG. 7. However, the first command CMD_1 is required to be fetched again from the host HOST in order to execute the first command CMD_1 from the interrupted point of execution of the first command CMD_1 again.

Figure 15:
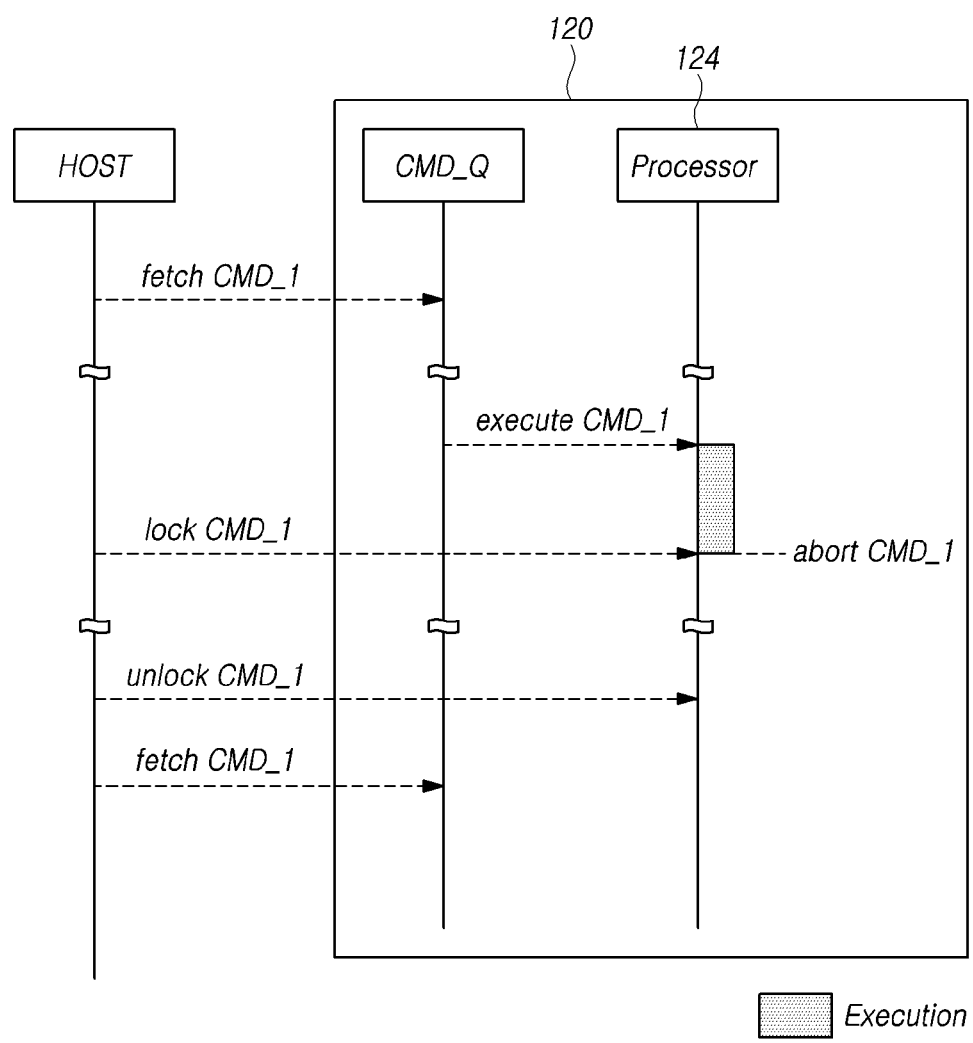
FIG. 15 is a diagram illustrating an example in which the memory controller described in FIG. 14 resumes execution of the first command.

FIG. 15 is a diagram illustrating an example in which the memory controller 120 described in FIG. 14 resumes execution of the first command.

Referring to FIG. 15, the host HOST may transmit the lock request for the first command CMD_1 to the memory controller 120 while the first command CMD_1 is being executed. When receiving the lock request for the first command CMD_1 from the host HOST, the processor 124 of the memory controller 120 may suspend the execution of the first command CMD_1 and abort the first command CMD_1.

Thereafter, the host HOST may transmit the unlock request for the first command CMD_1 to the memory controller 120. The processor 124 of the memory controller 120 may, when receiving the unlock request for the first command CMD_1 from the host, fetch the first command CMD_1 again into the command queue CMD_Q in order to execute the aborted first command CMD_1 again.

Even when execution of the first command CMD_1 is resumed after the execution of the first command CMD_1 is suspended for an amount of time corresponding to the suspend time value transmitted together with the lock request for the first command CMD_1, the processor of the memory controller 120 may fetch the first command CMD_1 back to the command queue CMD_Q.

Figure 16:
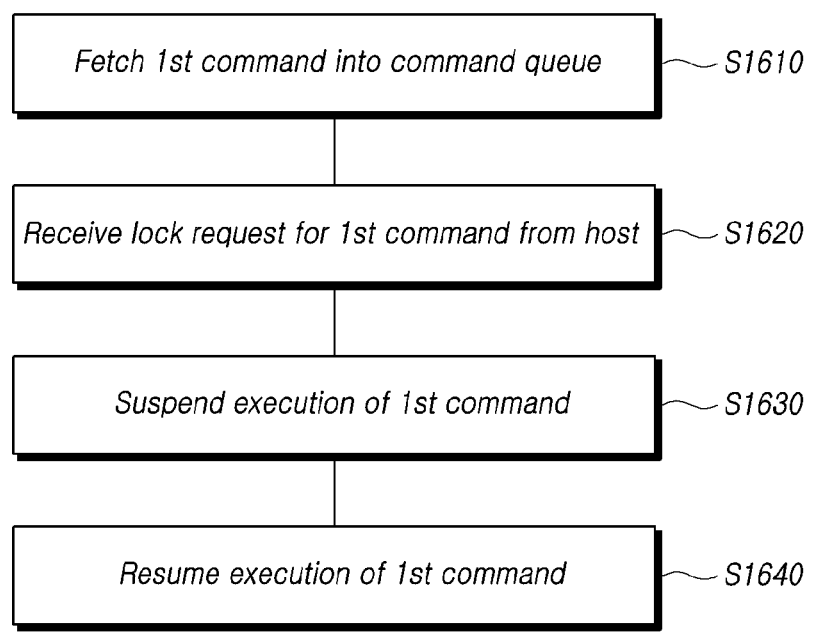
FIG. 16 is a diagram illustrating the operating method of the memory system according to embodiments of the present disclosure.

FIG. 16 is a diagram illustrating the operating method of the memory system 100 according to embodiments of the present disclosure.

Referring to FIG. 16, the operating method of the memory system 100 may include fetching the first command CMD_1 received from the host HOST into the command queue CMD_Q (S1610).

In addition, the operating method of the memory system 100 may include receiving the lock request for the first command CMD_1 from the host HOST (S1620).

Furthermore, the operating method of the memory system 100 may include suspending the execution of the first command CMD_1 when receiving the lock request for the first command CMD_1 from the host HOST (S1630).

In addition, the operating method of the memory system 100 may include resuming the execution of the first command when receiving the unlock request for the first command or after the execution of the first command CMD_1 is suspended for an amount of time corresponding to a suspend time value transmitted together with the lock request (S1640).

As an example, in operation S1630, the memory system 100 may store the first command CMD_1 in the locker when receiving the lock request for the first command CMD_1 from the host HOST. The locker is a buffer for storing a command for which the host transmits the lock request.

When storing the first command CMD_1 in the locker, information on the execution state of the first command CMD_1 may be stored in the locker together.

In this case, the operating method of the memory system 100 may further include popping the first command CMD_1 from the locker when resuming the execution of the first command CMD_1.

In addition, the operating method of the memory system 100 may further include executing the second command CMD_2, which is one of the commands stored in the command queue CMD_Q, after storing the first command CMD_1 in the locker.

As another example, when receiving the lock request for the first command CMD_1 from the host in operation S1620, the memory system 100 may abort the first command CMD_1.

In this case, the operating method of the memory system 100 may further include fetching the first command CMD_1 again into the command queue CMD_Q when resuming the execution of the first command CMD_1.

In some implementations, the operation of the memory controller 120 described above may be controlled by the control circuit 123 and may be performed in such a manner that the processor 124 executes (drives) firmware in which the overall operation of the memory controller 120 is programmed.

Figure 17:
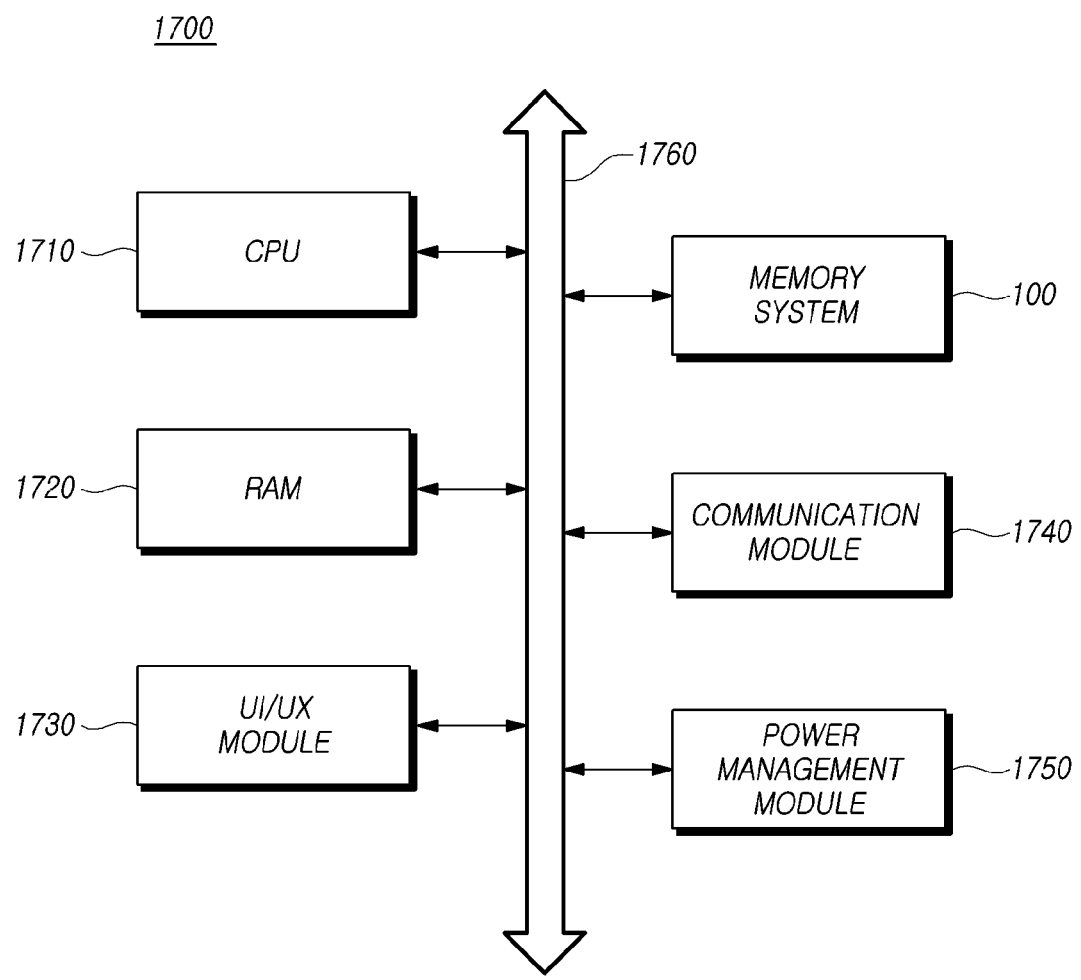
FIG. 17 is a diagram illustrating the configuration of a computing system based on some embodiments of the disclosed technology.

FIG. 17 is a diagram illustrating the configuration of a computing system 1700 based on an embodiment of the disclosed technology.

Referring to FIG. 17, the computing system 1700 based on an embodiment of the disclosed technology may include: a memory system 100 electrically connected to a system bus 1760; a CPU 1710 configured to control the overall operation of the computing system 1700; a RAM 1720 configured to store data and information related to operations of the computing system 1700; a user interface/user experience (UI/UX) module 1730 configured to provide the user with a user environment; a communication module 1740 configured to communicate with an external device as a wired and/or wireless type; and a power management module 1750 configured to manage power used by the computing system 1700.

The computing system 1700 may be a personal computer (PC) or may include a mobile terminal such as a smartphone, a tablet or various electronic devices.

The computing system 1700 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, engines, devices, modules, units, interfaces, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this present disclosure.

The above described embodiments of the present invention are intended to illustrate and not to limit the present invention. Various alternatives and equivalents are possible. The invention is not limited by the embodiments described herein. Other additions, subtractions, or modifications which are apparent in view of the present disclosure are intended to fall within the scope of the appended claims.

What is claimed is:

1. A memory system comprising:
a memory device; and
a memory controller for communicating with the memory device and controlling the memory device to process commands requested by a host,
wherein the memory controller:
fetches a first command from the host into a command queue,
suspends an execution of the first command at a time of receiving from the host a lock request for the first command,
aborts the execution of the first command in response to receiving the lock request from the host for the first command,
after the first command is aborted, executes a second command that is stored in the command queue after the first command is stored in the command queue, the second command is an operation that processes data having a size smaller than a size of data processed by the first command,
fetches the first command again from the host into the command queue in response to a receipt of an unlock request after the execution of the second command, and
resumes the execution of the first command after the first command is fetched again and the execution of the first command is suspended for an amount of time corresponding to a suspend time value transmitted together with the lock request.

2. The memory system of claim 1, wherein the memory controller includes a locker, which is a buffer for storing a command for which the host transmits the lock request, and further stores the first command in the locker when receiving the lock request for the first command from the host.

3. The memory system of claim 2, wherein the memory controller, when storing the first command in the locker, further stores in the locker execution state information indicating a state of the first command before suspending the execution of the first command.

4. The memory system of claim 2, wherein the memory controller further retrieves the first command from the locker when resuming the execution of the first command.

5. The memory system of claim 2, wherein the memory controller further executes the second command after storing the first command in the locker.

6. An operating method of a memory system comprising:
fetching a first command from a host into a command queue;
receiving a lock request for the first command from the host;
suspending an execution of the first command at a time of receiving from the host the lock request for the first command;
aborting the execution of the first command in response to receiving the lock request from the host for the first command;
after the first command is aborted, executing a second command that is stored in the command queue after the first command is stored in the command queue, the second command is an operation that processes data having a size smaller than a size of data processed by the first command;
fetching the first command again from the host into the command queue in response to a receipt of an unlock request after the execution of the second command; and
resuming the execution of the first command after the first command is fetched again and the execution of the first command is suspended for an amount of time corresponding to a suspend time value transmitted together with the lock request.

7. The operating method of the memory system of claim 6, wherein suspending the execution of the first command comprises storing the first command in a locker when receiving the lock request for the first command from the host, the locker being a buffer for storing a command for which the host transmits the lock request.

8. The operating method of the memory system of claim 7, wherein storing the first command in the locker includes storing in the locker execution state information indicating a state of the first command before suspending the execution of the first command.

9. The operating method of the memory system of claim 7, further comprising retrieving the first command from the locker when resuming the execution of the first command.

10. The operating method of the memory system of claim 7, further comprising executing the second command after storing the first command in the locker.

* * * * *